Patented Nov. 7, 1922.

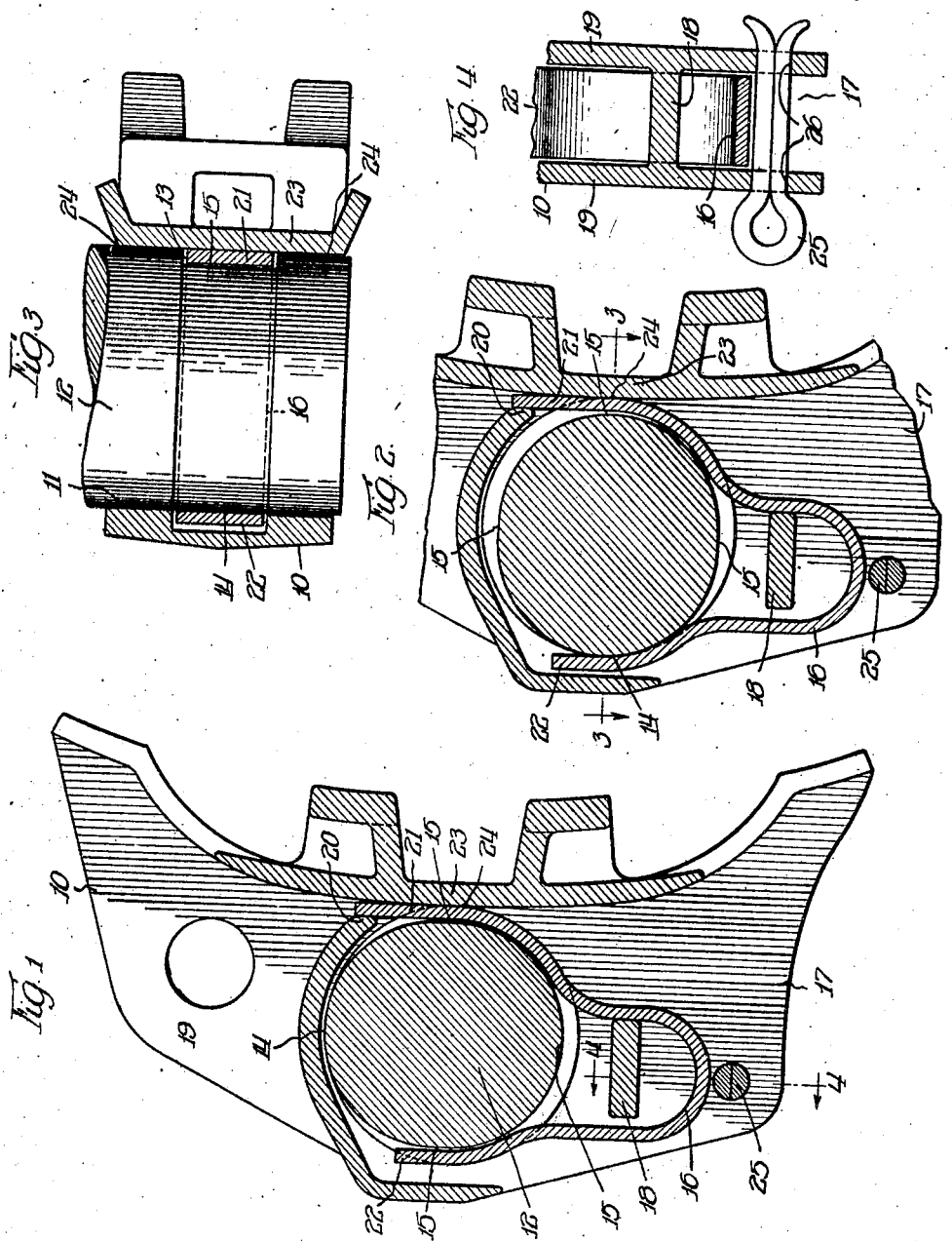

1,434,819

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

ADJUSTABLE BRAKE-HEAD ARRANGEMENT.

Application filed August 8, 1921. Serial No. 490,502.

*To all whom it may concern:*

Be it known that I, WILLIAM C. HEDGCOCK, a citizen of the United States, residing at Chicago, in the county of Cook and State of Illinois, have invented certain new and useful Improvements in Adjustable Brake-Head Arrangements, of which the following is a specification.

This invention relates to an adjustable brake head arrangement.

One object of the invention is to provide a simple and improved arrangement whereby a brake head is permitted to rotate or adjust itself when such is desired and prevented from rotating when it is not desired, the brake head being retained against longitudinal displacement on the brake beam sleeve or trunnion when in operative position.

Another object is to provide a simple and improved brake head arrangement in which the parts are reduced to a minimum and cooperate in a manner to meet the requirements for successful commercial operation.

These and other objects are accomplished by means of the arrangement disclosed on the accompanying sheet of drawings, in which—

Figure 1 is a vertical sectional view through a brake head embodying my invention, said brake head being shown mounted on a brake beam sleeve or trunnion in its initial assembling position;

Figure 2 is a similar fragmentary sectional view showing the brake head in its operative position;

Figure 3 is a sectional view taken in the plane of line 3—3 of Figure 2; and

Figure 4 is a sectional view taken in the plane of line 4—4 of Figure 1.

The various novel features of my invention will be apparent from the following description and drawings and will be particularly pointed out in the appended claims.

Referring to the figures of the drawings it will be noted that the brake head 10 has a cylindrical opening 11 for the reception of a brake beam sleeve or trunnion 12 on which the brake head is adjustably mounted. The brake beam trunnion 12 is provided with a cam-shaped peripheral groove 13, which, as shown, varies in depth from zero at the point 14 to its maximum depth at the points 15. The brake head is applied to the trunnion 12 with the trunnion shown in the position as indicated in Figure 1. With the parts in such position the U-shaped or forked spring 16 is applied through the lower opening 17 of the brake head and caused to straddle the trunnion 12. Under such conditions the lower forward part of the spring engages and rests against an abutment 18 extending between the side walls 19 of the brake head and the upper forward portion of the spring engages and rests against another abutment at 20. The spring when first inserted in place, as above described, occupies the cam-shaped groove but neither of the arms 21 or 22 of the spring engages the floor of the groove. With the parts thus relatively arranged, as shown in Figure 1, the trunnion is loose in the opening 11, or in other words, to show cooperation of the parts, the rear surface of the front wall 23 of the brake head is not engaged by the trunnion 12 and accordingly the brake head may be rotated a given amount on the trunnion before there is any frictional gripping action between the brake head and trunnion.

To place the brake head in operative position with respect to the brake beam trunnion 12 the brake head is given a relative clockwise movement with respect to the brake beam trunnion 12. During this relative movement the rear arm 22 of the spring 16 becomes engaged by the floor of the cam-shaped groove 13 and is forced outwardly to the left as shown in Figure 1, until said arm 22 of the spring occupies the position shown in Figure 2, in which position a portion of said arm 22 occupies the high spot 14 of the cam-shaped groove 13. This deflection of the spring causes tight contact between the rear surface of the front wall 23 of the brake head and the associated portion of the trunnion 12, as shown particularly at 24 in Figures 2 and 3 of the drawings. It is at this point that contact between the brake head and trunnion 12 is most essential because it is here that the braking forces also tend to cause contact. Accordingly the brake head frictional locking means works in harmony with the braking forces in maintaining contact with the brake head and the trunnion. Consequently resistance to rotation is caused. This friction is sufficiently great to prevent accidental rotation of the brake head upon the trunnion 12, but it is not too great for permitting proper automatic adjustment of the brake head on the trunnion 12 to correct a concentric condition between the brake shoe and associated wheel when they are pressed into braking relationship.

By means of the spring 16 engaging the cam groove the brake shoe is prevented from accidental withdrawal from the trunnion 12. The spring 16 is prevented from accidental displacement from the brake head by a key 25 which occupies a position directly under the spring 16 and extends through openings 26 in the side walls 19 of the brake head.

It is my intention to cover all modifications of the invention falling within the spirit and scope of the following claims.

I claim:—

1. In brake mechanism, the combination of a brake head having a trunnion receiving portion, a trunnion upon which the brake head is mounted and having a cam-shaped groove therein, and a curved spring having two legs associated with said groove, one leg being at the front of said trunnion and the other at the rear thereof to force said brake head and trunnion into frictional engagement for frictionally maintaining said brake head in adjusted position.

2. In brake mechanism, the combination of a brake head having a trunnion receiving portion, a trunnion upon which the brake head is mounted and having a cam-shaped groove therein, and a resilient member having two legs associated with said groove and in one position having one leg at the front of the trunnion and the other at the rear thereof for forcing the front wall of the brake head into engagement with the associated portion of the trunnion for frictionally maintaining said brake head in adjusted position.

3. In brake mechanism, the combination of a brake head, a support upon which said brake head is mounted and having a cam-shaped groove, a U-shaped spring occupying said groove at the front and rear of said support, which spring when its legs are forced apart a predetermined amount forces the support and brake head into frictional engagement for frictionaly maintaining the brake head in adjusted position.

4. In brake mechanism, the combination of a brake head, a support upon which said brake head is mounted and having a cam-shaped groove, a U-shaped spring occupying said groove at the front and rear of said support, which spring when its legs are forced apart a predetermined amount forces the support and brake head into frictional engagement for frictionally maintaining the brake head in adjusted position, and means for preventing accidental displacement of said spring.

Signed at Chicago, Illinois, this 2nd day of August, 1921.

WILLIAM C. HEDGCOCK.